(12) United States Patent
Luka et al.

(10) Patent No.: US 12,384,350 B2
(45) Date of Patent: Aug. 12, 2025

(54) CONTROL DEVICE AND METHOD FOR DETERMINING A P-V CHARACTERISTIC OF AT LEAST ONE WHEEL BRAKE CYLINDER OF A BRAKE SYSTEM OF A VEHICLE

(71) Applicant: Robert Bosch GmbH, Stuttgart (DE)

(72) Inventors: Maximilian Luka, Bad Friedrichshall (DE); Dirk Foerch, Neuenstadt/Stein (DE); Mario Seiler, Unterheinriet (DE); Nico Pflueger, Schwetzingen (DE); Nikolai Mueller, Stuttgart (DE); Robin Gruenagel, Neuenstadt Am Kocher (DE)

(73) Assignee: ROBERT BOSCH GMBH, Stuttgart (DE)

( * ) Notice: Subject to any disclaimer, the term of this patent is extended or adjusted under 35 U.S.C. 154(b) by 295 days.

(21) Appl. No.: 18/245,927

(22) PCT Filed: Oct. 25, 2021

(86) PCT No.: PCT/EP2021/079483
§ 371 (c)(1),
(2) Date: Mar. 20, 2023

(87) PCT Pub. No.: WO2022/096299
PCT Pub. Date: May 12, 2022

(65) Prior Publication Data
US 2023/0382364 A1   Nov. 30, 2023

(30) Foreign Application Priority Data

Nov. 4, 2020   (DE) .................. 10 2020 213 860.5

(51) Int. Cl.
*B60T 17/22*      (2006.01)
*B60T 13/68*      (2006.01)

(52) U.S. Cl.
CPC .......... *B60T 17/221* (2013.01); *B60T 13/683* (2013.01); *B60T 2270/406* (2013.01)

(58) Field of Classification Search
CPC .............................. B60T 17/22; B60T 17/221
(Continued)

(56) References Cited

U.S. PATENT DOCUMENTS 6,546,326 B1 *   4/2003   Gerdes .................. B60T 8/1755
                                                          123/295
6,652,039 B1 *   11/2003  Shull ....................... B60T 8/404
                                                          303/113.5
(Continued)

FOREIGN PATENT DOCUMENTS

DE   102009028542 A1   2/2011
DE   102013203189 A1   9/2013
(Continued)

OTHER PUBLICATIONS

International Search Report for PCT/EP2021/079483, Issued Jan. 24, 2022.

*Primary Examiner* — Eric S. McCall
(74) *Attorney, Agent, or Firm* — NORTON ROSE FULBRIGHT US LLP

(57) ABSTRACT

A method for determining a p-V characteristic of at least one wheel brake cylinder of a brake system of a vehicle. The method includes: increasing a pressure prevailing in the wheel brake cylinder during a measurement time interval, wherein a volume variable that reflects a present volume in the wheel brake cylinder, and a pressure variable that reflects a present pressure in the wheel brake cylinder, are determined at least once during the measurement time interval, and setting the p-V characteristic of the wheel brake cylinder taking into consideration the volume variable and the pressure variable. Before the measurement time interval, during a pressure increase interval, a pressure exerted on the closed (Continued)

wheel inlet valve and/or the closed isolating valve is increased with an average pressure build-up gradient greater than or equal to 50 bar/second up to a limit pressure of greater than or equal to 25 bar.

10 Claims, 4 Drawing Sheets

(58) Field of Classification Search
USPC .............................................................. 73/39
See application file for complete search history.

(56) References Cited

U.S. PATENT DOCUMENTS

| | | | |
|---|---|---|---|
| 2015/0166024 A1* | 6/2015 | Biller | B60T 8/4081 |
| | | | 701/93 |
| 2021/0179041 A1* | 6/2021 | Matoy | B60T 17/22 |
| 2023/0339444 A1* | 10/2023 | Johnson | B60T 13/745 |
| 2024/0359676 A1* | 10/2024 | Jang | B60T 13/745 |
| 2025/0033625 A1* | 1/2025 | Fertig | B60T 13/686 |

FOREIGN PATENT DOCUMENTS

| | | |
|---|---|---|
| DE | 102012210429 A1 | 12/2013 |
| DE | 102015204764 A1 | 9/2016 |
| JP | H11286271 A | 10/1999 |
| WO | 2014076820 A1 | 5/2014 |
| WO | 2014157327 A1 | 10/2014 |

* cited by examiner

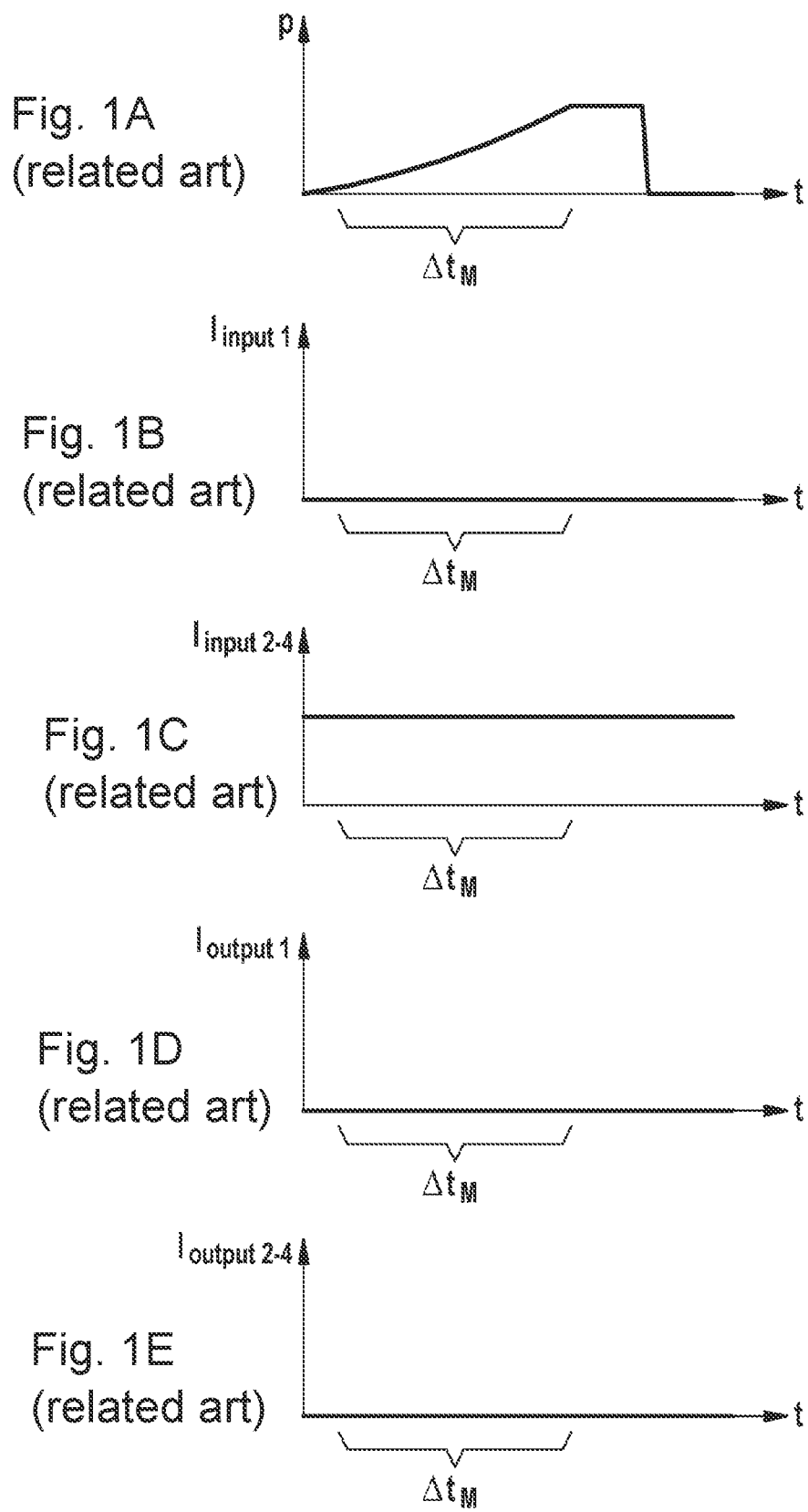

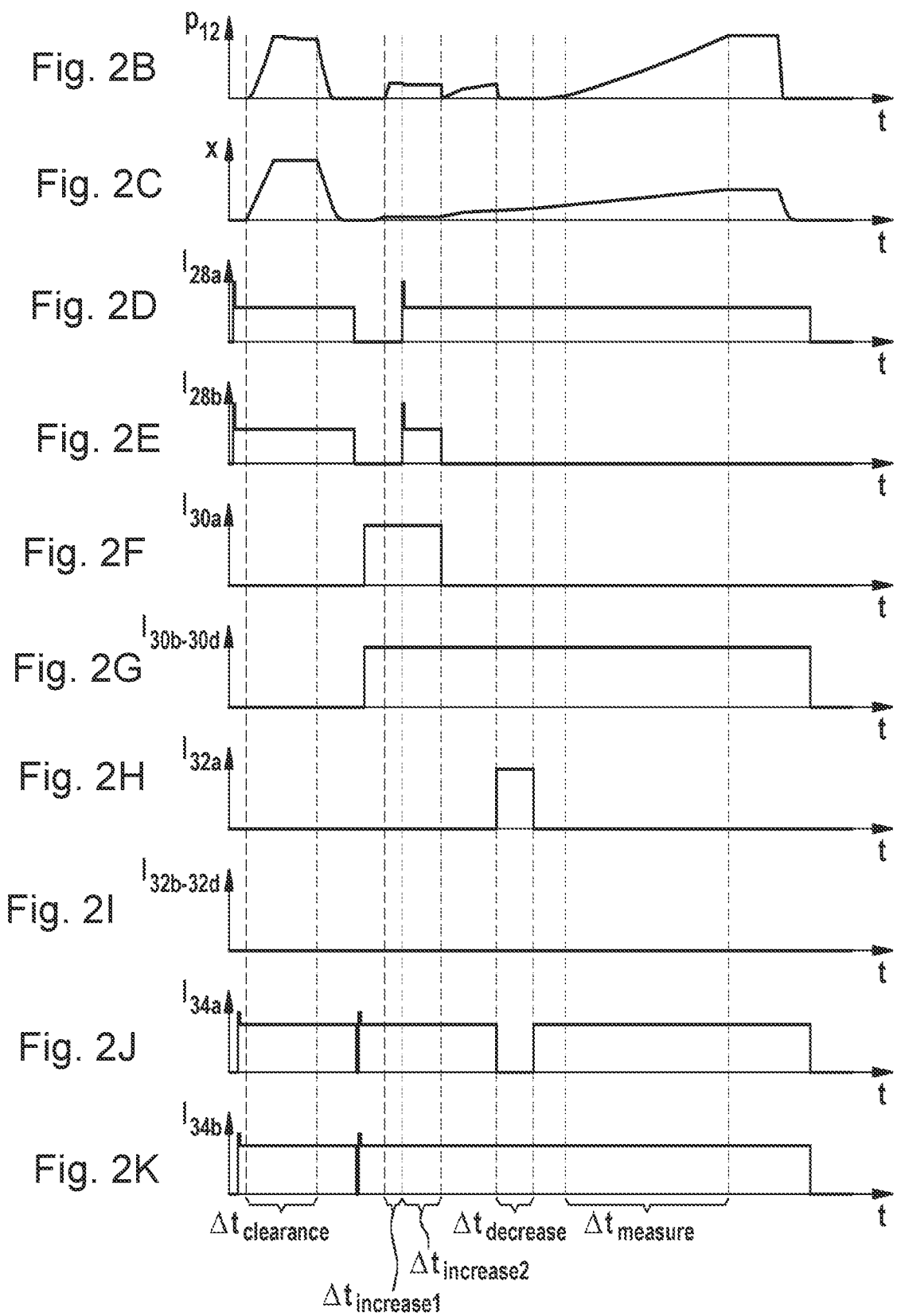

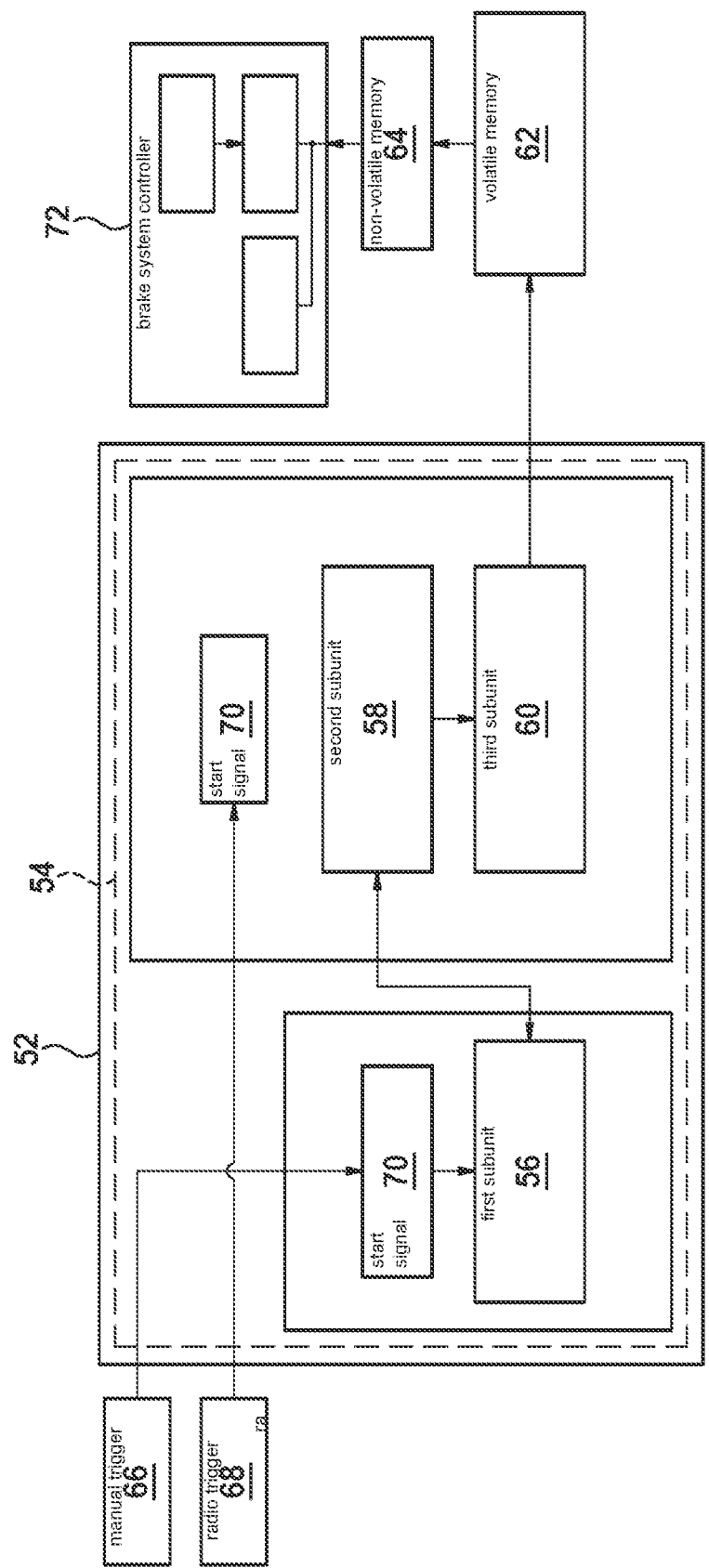

CONTROL DEVICE AND METHOD FOR DETERMINING A P-V CHARACTERISTIC OF AT LEAST ONE WHEEL BRAKE CYLINDER OF A BRAKE SYSTEM OF A VEHICLE

FIELD

The present invention relates to a method for determining a p-V characteristic of at least one wheel brake cylinder of a brake system of a vehicle. Likewise, the present invention relates to a control device for a brake system of a vehicle and to a brake system for a vehicle.

BACKGROUND INFORMATION

FIGS. 1A to 1E show coordinate systems for explaining a conventional procedure for setting a p-V characteristic of at least one wheel brake cylinder of an on-board brake system. The conventional procedure described in the following is known to the Applicant as an internal prior art.

In the coordinate systems of FIGS. 1A to 1E, the abscissa is in each case a time axis t. By means of the ordinate of the coordinate system of FIG. 1A, a pressure p prevailing in a first wheel brake cylinder of the on-board brake system is reflected. (However, the on-board brake system comprises three additional wheel brake cylinders.) The ordinate of the coordinate system of FIG. 1B indicates a current intensity $I_{input1}$ of a control signal provided to a first wheel inlet valve (upstream of the first wheel brake cylinder), whereas a current intensity $I_{input2-4}$ of the control signals output to the three other wheel inlet valves of the three other wheel brake cylinders is reflected by means of the ordinate of the coordinate system of FIG. 1C of FIG. 1D indicates a current intensity $I_{output1}$ of a control signal provided to a first wheel inlet valve (upstream of the first wheel brake cylinder), whereas a current intensity $I_{output2-4}$ of the control signals output to the three other wheel inlet valves of the three other wheel brake cylinders is reflected by means of the ordinate of the coordinate system of FIG. 1E. Whereas the wheel inlet valves are normally open valves, the wheel outlet valves are normally closed valves.

As can be seen in the coordinate system of FIG. 1A, in the conventional procedure described here, the pressure p prevailing in the first wheel brake cylinder is increased during a measurement time interval $\Delta t_M$. The increase in brake pressure in the first wheel brake cylinder is effected by displacing brake fluid via the open-controlled first wheel inlet valve into the first wheel brake cylinder, whereas the three other wheel inlet valves and all four wheel outlet valves are controlled closed during the measurement time interval $\Delta t_M$. At least once during the measurement time interval $\Delta t_M$, a volume variable that reflects a present volume in the first wheel brake cylinder and at the same time a pressure variable that reflects the present pressure p in the first wheel brake cylinder are determined. Subsequently, the p-V characteristic of the first wheel brake cylinder may be set based on the at least one volume variable and the at least one pressure variable.

SUMMARY

The present invention provides a method for determining a p-V characteristic of at least one wheel brake cylinder of a brake system of a vehicle, a control device for a brake system of a vehicle, and a brake system for a vehicle.

The present invention may provide improved possibilities for precisely and accurately determining a p-V characteristic of at least one wheel brake cylinder of a brake system of a vehicle, such as an elasticity of the at least one wheel brake cylinder and/or a stiffness of the at least one wheel brake cylinder. In particular, a wheel-specific/wheel-brake-cylinder-specific p-V characteristic of an individual wheel brake cylinder (including its pressure transfer device/brake lines) can be determined precisely and reliably by means of the present invention (for all wheel brake cylinders of the respective brake system). The possibilities created by means of the present invention can independently determine/measure the p-V characteristic or independently adjust a value, stored as a p-V characteristic, to the actual p-V characteristic of the at least one wheel brake cylinder. If desired, the determined or adjusted p-V characteristic of the at least one wheel brake cylinder can subsequently be stored directly in a control unit or in a memory unit. Whereas by means of the conventional procedure described above, such processes can only be reliably executed in a garage during a development and application process of the respective brake system since individual wheel brake lines of the brake system must be unscrewed and/or special high-priced equipment is required, the present invention allows a reliable determination of the p-V characteristic of the at least one wheel brake cylinder, even outside of a garage. Since it is not necessary to open the wheel lines when using the possibilities created by means of the present invention for determining the p-V characteristic of the at least one wheel brake cylinder, the conventional need for venting in order to remove air that has entered into the brake system, in the best possible way with a venting method during execution of the conventional procedure is also eliminated. In addition, this also eliminates the conventional risk that a residual proportion of air remains in the brake system despite the execution of the venting method. It is also pointed out here that a use of the possibilities created by means of the present invention for determining the p-V characteristic of the at least one wheel brake cylinder does not require expensive equipment.

When using the possibilities created by means of the present invention to determine the p-V characteristic of the at least one wheel brake cylinder, there is thus also no loss of time until a free appointment is available in a garage. When executing the conventional procedure described above, the associated time loss is often significant since it may take up to 6 hours for the respective measurement, during which the vehicle is not available for other tests. Instead, the possibilities according to the present invention often take less than 5 minutes to determine the p-V characteristic of the at least one wheel brake cylinder. Additionally, the present invention creates opportunities for controlling a quality and a tolerance situation of at least the wheel brake cylinders of a brake system installed on a vehicle by executing a routine.

A further particular advantage of the present invention is that by using it, the p-V characteristic of the at least one wheel brake cylinder can be repeatedly re-determined/corrected during operation of the respective brake system, without the need for a visit to the garage. This is associated with considerable cost savings, wherein due to the repeatedly verified or corrected knowledge of the p-V characteristic of the at least one wheel brake cylinder, a performance of the respective brake system can be maintained at a high level. By means of the present invention, the "true" p-V relationship can thus be repeatedly determined again, as a result of which the effects of aging effects on the brake system can be counteracted (in particular without again venting at least one wheel brake cylinder of the respective brake system).

In an advantageous embodiment of the method of the present invention, during a first pressure increase interval, a partial volume pressure prevailing in a partial volume of the brake system limited by the at least one closed isolating valve is increased by means of a driver braking force exerted on a brake pedal of the brake system and/or by means of an operation of a motorized brake pressure build-up device up to at least the limit pressure of greater than or equal to 25 bar, wherein at the beginning of a second pressure increase interval, the at least one isolating valve is opened, whereby brake fluid is displaced with the average pressure build-up gradient of greater than or equal to 50 bar/second from the partial volume (48) via the at least one isolating valve (28a) to the at least one wheel inlet valve (30a). As is apparent from the description below, the procedure described in this paragraph allows the desired pressure to be successively at the at least one isolating valve and at the at least one wheel inlet valve during the pressure increase interval, wherein the at least one wheel inlet valve, at least one check valve arranged in parallel to the at least one wheel inlet valve, and the at least one isolating valve are so reliably sealed that they have no influence on the increase in pressure in the at least one wheel brake cylinder during the measurement interval. This allows a more precise and more reliable setting of the p-V characteristic of the at least one wheel brake cylinder.

According to an example embodiment of the present invention, preferably, after the at least one pressure increase interval and before the measurement time interval, the pressure prevailing in the at least one wheel brake cylinder is reduced during a pressure reduction interval by draining brake fluid from the at least one wheel brake cylinder via at least one wheel outlet valve of the brake system downstream of the at least one wheel brake cylinder. Draining brake fluid via the at least one wheel outlet valve has no influence on the reliable sealing, effected during the pressure increase interval, of the at least one wheel inlet valve, the at least one check valve, and/or the at least one isolating valve.

In particular, the pressure prevailing in the at least one wheel brake cylinder may be increased during the measurement time interval with an average pressure build-up gradient of less than or equal to 35 bar/second. Such a "slow" pressure increase allows precise determination of the at least one volume variable and at the same time the at least one pressure variable so that the p-V characteristic can be set very precisely.

In a further advantageous example embodiment of the method of the present invention, the pressure exerted on at least the at least one closed wheel inlet valve and/or the at least one closed isolating valve is increased during the at least one pressure increase interval with the average pressure build-up gradient of greater than or equal to 50 bar/second up to the limit pressure of greater than or equal to 25 bar, wherein the limit pressure is sufficient to seal at least one check valve arranged in parallel to the at least one wheel inlet valve and/or sufficient to seal the at least one isolating valve. The at least one wheel inlet valve, the at least one check valve, and/or the at least one isolating valve are thus already present in their respective closed positions before the measurement time interval so that during the displacement, performed during the measurement time interval, of brake fluid into the at least one wheel brake cylinder, no volume of brake fluid is "lost" due to insufficient sealing of the at least one wheel inlet valve, of the at least one check valve, and/or of the at least one isolating valve. This allows more precise knowledge of the volume of brake fluid displaced in the at least one wheel brake cylinder, and thus also more precise and reliable setting of the p-V characteristic.

As an advantageous development of the method of the present invention, before the at least one pressure increase interval, the pressure prevailing in the at least one wheel brake cylinder can be increased during a clearance closing interval up to a clearance closing pressure of greater than or equal to 40 bar, and then, and before the at least one pressure increase interval, the pressure prevailing in the at least one wheel brake cylinder can be reduced to an output pressure of less than or equal to 5 bar. By means of the process described in the paragraph written here, it can be ensured that the clearance of the at least one wheel brake cylinder is already closed before the measurement time interval, whereby precision and accuracy of the set p-V characteristic can additionally be improved.

According to the present invention, the advantages described above can also be provided by means of a corresponding control device for a brake system of a vehicle. The control device may be developed in accordance with the embodiments of the method explained above. The electronic device can additionally be designed and/or programmed, for example, to effect or detect, by means of at least one provided sensor signal, during a first pressure increase interval, that a partial volume pressure prevailing in a partial volume of the brake system limited by the at least one closed isolating valve is increased at least at the end of the first pressure increase interval by means of a driver braking force exerted on a brake pedal of the brake system and/or by means of an operation of a motorized brake pressure build-up device up to at least the limit pressure of greater than or equal to 25 bar, and at the beginning of a second pressure increase interval, to open the at least one isolating valve such that a brake fluid displacement with the average pressure build-up gradient of greater than or equal to 50 bar/second from the partial volume via the at least one isolating valve to the at least one closed wheel inlet valve is triggered. In particular, the electronic device may be designed and/or programmed to control during the first pressure increase interval, as the motorized brake pressure build-up device, a motorized plunger device integrated into the brake system, an electromechanical brake booster or a pump motor of at least one pump of the brake system upstream of a master brake cylinder of the brake system such that the partial volume pressure is increased by means of the controlled motorized brake pressure build-up device at least at the end of the first pressure increase interval up to at least the limit pressure of greater than or equal to 25 bar.

Furthermore, according to the present invention, the advantages described above are also ensured in a corresponding brake system for a vehicle with such a control device, the at least one wheel brake cylinder, and the at least one wheel inlet valve upstream of the at least one wheel brake cylinder and/or the at least one isolating valve upstream of the at least one wheel brake cylinder. The brake system may also be developed in accordance with the embodiments of the method explained above.

BRIEF DESCRIPTION OF THE DRAWINGS

Further features and advantages of the present invention are explained below with reference to the figures.

FIGS. 1A to 1E shows coordinate systems for explaining a conventional procedure for setting a p-V characteristic of at least one wheel brake cylinder of an on-board brake system.

FIGS. 2A to 2K show schematic representation of a brake system and coordinate systems for explaining an example embodiment of the method for determining a p-V characteristic of at least one wheel brake cylinder of the brake system, according to the present invention.

FIG. 3 shows a schematic representation of an example embodiment of the control device, according to the present invention.

DETAILED DESCRIPTION OF EXAMPLE EMBODIMENTS

Figure 2A:
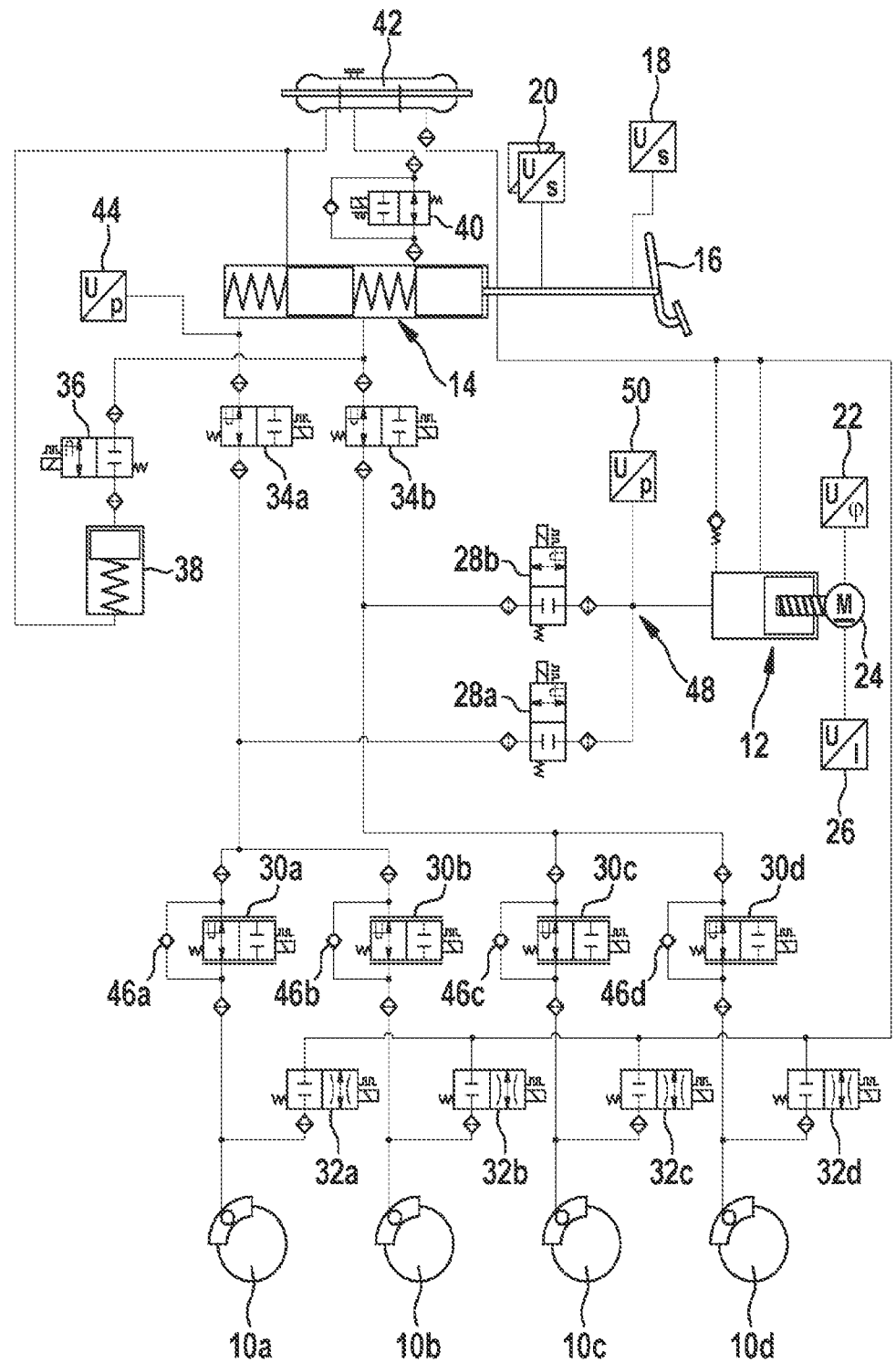

FIGS. 2A to 2K show a schematic representation of a brake system and coordinate systems for explaining an embodiment of the method for determining a p-V characteristic of at least one wheel brake cylinder of the brake system.

FIG. 2A reflects an example of a brake system of a vehicle for which the method described in the following may be utilized to determine a p-V characteristic of at least one wheel brake cylinder 10a. It is however pointed out that an executability of the method described in the following is limited to neither the brake system type illustrated schematically in FIG. 2A nor a particular vehicle/motor vehicle type of the vehicle/motor vehicle equipped with the respective brake system. For example, the total number of exactly four wheel brake cylinders 10a to 10d of the brake system shown in FIG. 2A is to be interpreted only by way of example. A first wheel brake cylinder 10a and a second wheel brake cylinder 10b are connected to a first brake circuit of the brake system, whereas a third wheel brake cylinder 10c and a fourth wheel brake cylinder 10d are connected to the second brake circuit of the brake system.

During the method described in the following, a wheel-specific/wheel-brake-cylinder-specific p-V characteristic of the first wheel brake cylinder 10a is determined. However, the method described in the following may respectively also be performed for the other three wheel brake cylinders 10b to 10d. If desired, a p-V characteristic of more than only one of the wheel brake cylinders 10a to 10d may also be set by means of the procedure described in the following. Of course, this is also true for a vehicle/motor vehicle with fewer or more than four wheel brake cylinders 10a to 10d, for example on a 3-axle vehicle.

The embodiment of the method reflected by means of FIGS. 2A to 2K begins, by way of example, with a closing of a clearance at least of the first wheel brake cylinder 10a by increasing, during a so-called clearance closing interval $\Delta t_{clearance}$, at least the pressure prevailing in the first wheel brake cylinder 10a up to a clearance closing pressure of greater than or equal to 40 bar. If desired, during the clearance closing interval $\Delta t_{clearance}$, the brake pads of all wheel brake cylinders 10a to 10d can be completely applied by means of a pressure build-up effected in the wheel brake cylinders 10a to 10d, thereby ensuring that the clearances of the wheel brake cylinders 10a to 10d do not affect the method steps described in the following. The pressure build-up effected at least in the first wheel brake cylinder 10a during the clearance closing interval $\Delta t_{clearance}$ may in particular be greater than or equal to 80 bar, for example greater than or equal to 120 bar, specifically greater than or equal to 180 bar. However, the numerical values mentioned here are to be interpreted only by way of example.

The brake system illustrated schematically in FIG. 2A comprises, by way of example, a motorized plunger device 12 as a motorized brake pressure build-up device for effecting the brake pressure build-up at least in the first wheel brake cylinder 10a during the clearance closing interval $\Delta t_{clearance}$. The motorized plunger device 12 may in particular be a piston-cylinder device integrated into the brake system, such as, specifically, an integrated power brake (IPB) device. However, it is pointed out that instead of or in addition to the motorized plunger device 12, other types of motorized brake pressure build-up devices, such as an electromechanical brake booster upstream of a master brake cylinder 14 of the brake system or a pump motor of at least one pump of the brake system, can be used or also used to effect the brake pressure build-up at least in the first wheel brake cylinder 10a during the clearance closing interval $\Delta t_{clearance}$. Even if the brake system does not comprise a motorized brake pressure build-up device, a driver braking force which is exerted on a brake pedal 16 of the brake system and can be detected in particular by means of a rod travel sensor 18 and/or by means of a differential travel sensor 20 may be used or also used to effect the pressure build-up at least in the first wheel brake cylinder 10a. From the driver braking force, a pressure build-up effected by means of the driver braking force at least in the master brake cylinder 14 and/or a volume displaced by means of the driver braking force can then usually be reliably estimated by means of a characteristic curve stored on a computer. The use of a sensor to measure the volume displaced by the driver braking force is thus often not necessary. A driver of the respective vehicle, or an operator or mechanic, may also be prompted, by means of a light signal, by means of a sound signal and/or by means of an image display, to exert a correspondingly high driver braking force on the brake pedal 16 of his/her vehicle.

The coordinate systems of FIGS. 2B to 2K have in each case a time axis t as the abscissa. The coordinate system of FIG. 2B has a pressure $p_{12}$ prevailing at/in the motorized plunger device 12 as the ordinate, whereas the ordinate of the coordinate system of FIG. 2C indicates an adjustment travel x of a piston of the motorized plunger device 12 from its initial position. For example, the adjustment travel x may be determined by means of a rotor position sensor 22 of a motor 24 of the motorized plunger device 12. Optionally, the motor 24 of the motorized plunger device 12 may additionally be equipped with a motor current sensor 26.

In the example of FIG. 2A, motorized plunger device 12 is connected via a first isolating valve 28a to the first brake circuit of the brake system and via a second isolating valve 28b to the second brake circuit of the brake system. The coordinate systems of FIGS. 2D and 2E indicate, by means of their ordinates, a current intensity $I_{28a}$ of a control signal output to the first isolating valve 28a and a current intensity $I_{28b}$ of a control signal output to the second isolating valve 28b. As can be seen in FIG. 2A, the isolating valves 28a and 28b are each normally closed valves.

In addition, in the brake system of FIG. 2A, one wheel inlet valve 30a to 30d is upstream and one wheel outlet valve 32a to 32d is downstream of each wheel brake cylinder 10a to 10d. Whereas the wheel inlet valves 30a to 30d are normally open valves, the wheel outlet valves 32a to 32d are normally closed valves. The ordinate of the coordinate system of FIG. 2F indicates a current intensity $I_{30a}$ of a control signal output to a first wheel inlet valve 30a upstream of the first wheel brake cylinder 10a. The current intensities $I_{30b\text{-}30d}$ of the control signals provided to the further wheel inlet valves 30b to 30d are reflected by means of the ordinate of the coordinate system of FIG. 2G. A first wheel outlet valve 32a downstream of first wheel brake cylinder 10a is controlled by means of a control signal, the current intensity $I_{32a}$ of which is represented by means of the ordinate of the coordinate system of FIG. 2H. The current intensities $I_{32b-32d}$ of the control signals of the further wheel outlet valves 32b to 32d are indicated by means of the ordinate of the coordinate system of FIG. 2I.

The first brake circuit of the brake system of FIG. 2A is also connected via a first disconnecting valve 34a to the master brake cylinder 14, whereas its second brake circuit is connected via a second disconnecting valve 34b to the master brake cylinder 14. As can be seen in FIG. 2A, the disconnecting valves 34a and 34b are each normally open valves. The ordinate of the coordinate system of FIG. 2J indicates a current intensity $I_{34a}$ of a control signal output to the first disconnecting valve 34a and the ordinate of the coordinate system of FIG. 2K indicates a current intensity $I_{34b}$ of a control signal output to the second disconnecting valve 34b. By closing both disconnecting valves 34a and 34b, all the wheel brake cylinders 10a to 10d can be disconnected from the master brake cylinder 14, wherein the driver operating the brake pedal 16 may, if appropriate, brake into a simulator 38 via a simulator connecting valve 36. Optionally, the master brake cylinder 14 may still be connected to a brake fluid reservoir 42 via a reservoir disconnecting valve 40. A primary pressure sensor 44 may also be connected to the brake master cylinder 14.

Due to the above-described configuration of the brake system of FIG. 2A with the valves 28a, 28b, 30a to 30d, 32a to 32d, 34a and 34b, in order to effect a closing of the clearances of all wheel brake cylinders 10a to 10d by means of a motorized plunger 12 during the clearance closing interval $\Delta t_{clearance}$ brake fluid is displaced via the open isolating valves 28a and 28b and the open wheel inlet valves 30a to 30d into the wheel brake cylinders 10a to 10d, whereas the wheel outlet valves 32a to 32d and disconnecting valves 34a and 34b are kept closed or controlled to be closed. This is reflected by means of the coordinate systems of FIGS. 2D to 2K. The closing of the clearances of the wheel brake cylinders 10a to 10d creates advantageous reproducible conditions for performing the method steps described in the following but is only an optional method step of the embodiment of the method described herein. After the clearance closing interval $\Delta t_{clearance}$ the pressure in the first wheel brake cylinder 10a is reduced to an output pressure of less than or equal to 5 bar, preferably an output pressure equal to the atmospheric pressure.

It is of particular advantage in the method described herein that a pressure exerted on at least the closed first wheel inlet valve 30a and/or the closed first isolating valve 28a is also increased during at least one pressure increase interval $\Delta t_{increase1}$ and $\Delta t_{increase2}$ with an average pressure build-up gradient of greater than or equal to 50 bar/second up to a limit pressure of greater than or equal to 25 bar. The limit pressure may in particular be greater than or equal to 40 bar, for example greater than or equal to 60 bar, specifically greater than or equal to 80 bar. The average pressure build-up gradient of the pressure increase in the first wheel brake cylinder 10a during the at least one pressure increase interval $\Delta t_{increase1}$ and $\Delta t_{increase2}$ may be greater than or equal to 60 bar/second, e.g., greater than or equal to 70 bar/second, specifically greater than or equal to 80 bar/second. In particular, the average pressure build-up gradient may be a quotient of the pressure increase effected at the respective valve 28a or 30a during the respective pressure increase interval $\Delta t_{increase1}$ and $\Delta t_{increase2}$ divided by a duration of the respective pressure increase interval $\Delta t_{increase1}$ and $\Delta t_{increase2}$.

The pressure exerted on at least the closed first wheel inlet valve 30a and/or the closed first isolating valve 28a, with the average pressure build-up gradient of greater than or equal to 50 bar/second up to the limit pressure of greater than or equal to 25 bar effects pressurization of at least the first wheel inlet valve 30a, a first check valve 46a arranged in parallel to the first wheel inlet valve 30a, and the first isolating valve 28a during the at least one pressure increase interval $\Delta t_{increase1}$ and $\Delta t_{increase2}$ so that their valve bodies are pressed against the respective valve seat. This results in a (substantially) liquid-tight seal of at least the first wheel inlet valve 30a, the first check valve 46a, and the first isolating valve 28a, the advantages of which are discussed below.

In particular, the pressure with the average pressure build-up gradient of greater than or equal to 50 bar/second up to the limit pressure of greater than or equal to 25 bar may be exerted on all closed isolating valves 28a and 28b and on all closed wheel inlet valves 30a to 30d during the at least one pressure increase interval $\Delta t_{increase1}$ and $\Delta t_{increase2}$. In this case, this effects both pressurization of the isolating valves 28a and 28b and pressurization of the wheel inlet valves 30a to 30d, and of their check valves 46a to 46d arranged in parallel to the respective wheel inlet valves 30a to 30d, thereby pressing the valve bodies of the respective valves 28a and 28b, 30a to 30d, and 46a to 46d against their respective valve seats and, in this way, sealing the valves 28a and 28b, 30a to 30d, and 46a to 46d. In particular, the valve bodies of check valves 46a to 46d are pressed against their respective valve seats and the check valves 46a to 46d are thus closed in the best possible way. This sealing of the valves 28a and 28b, 30a to 30d, and 46a to 46d, in particular effected by means of the comparatively high pressure build-up gradient, prevents, during a subsequently performed pressure build-up in the first wheel brake cylinder 10a, which is described below, manufacturing tolerances, such as, in particular, manufacturing tolerances of the check valves 46a to 46d, from resulting in leakage on a non-reliably sealed valve, whereby volume could go "lost." The method steps performed during the at least one pressure increase interval $\Delta t_{increase1}$ and $\Delta t_{increase2}$ thus effect an advantageous pre-conditioning of the valves 28a and 28b, 30a to 30d, and 46a to 46d for the precise and accurate setting of the p-V characteristic.

Advantageously, in the method described herein, during a first pressure increase interval $\Delta t_{increase1}$, a partial volume pressure prevailing in a partial volume 48 of the brake system is first increased up to at least the limit pressure of greater than or equal to 25 bar. The partial volume 48 is understood to mean a volume of the brake system that is limited at least by the closed first isolating valve 28a (and optionally also by the closed second isolating valve 28b) so that a brake fluid displacement from the partial volume 48 to the closed first wheel inlet valve 30a can be triggered by means of an opening of at least the first isolating valve 28a. The comparatively high average pressure build-up gradient described above of greater than or equal to 50 bar/second can thus be effected by opening at least the first isolating valve 28a and possibly also the second isolating valve 28b at the beginning of a second pressure increase interval $\Delta t_{increase2}$. In particular, in this way, an "abrupt pressure build-up" can be triggered at all wheel inlet valves 30a to 30d with the comparatively high average pressure increase gradient. By means of the procedure described herein, the "abrupt pressure build-up" with the comparatively high average pressure increase gradient may also be effected if the motorized plunger device 12, another type of motorized brake pressure build-up device used and/or the driver braking force presently exerted on the brake pedal 16 is not suitable for effecting such a high gradient. Thus, a comparatively cost-effective motorized plunger device 12 comprising a relatively low-power motor 24, or another cost-effective type of a motorized brake pressure build-up device may also be advantageously used to perform the method described herein. Even the driver braking force exerted on the brake pedal 16 may be used by means of the advantageous procedure described herein to effect the comparatively high average pressure build-up gradient, for which purpose the driver of the respective vehicle may be prompted, possibly by means of a light signal, by means of a sound signal, and by means of an image display, to actuate brake pedal 16.

As is apparent from the coordinate systems of FIGS. 2D to 2K, valves 28a, 28b, 30a to 30d, 32a to 32d, 34a and 34b are closed before the at least one pressure increase interval $\Delta t_{increase1}$ and $\Delta t_{increase2}$. At the start of the second pressure increase interval $\Delta t_{increase2}$, in the method described herein, the isolating valves 28a and 28b are first opened "abruptly," resulting in a "quick" pressure build-up at the wheel inlet valves 30a to 30d and their check valves 46a to 46d, thereby reliably sealing the valves 28a, 28b, 30a to 30d, 32a to 32d. Subsequently, the first wheel inlet valve 30a is also opened.

After the at least one pressure increase interval $\Delta t_{increase1}$ and $\Delta t_{increase2}$ and before a measurement time interval $\Delta t_{measure}$ described below, the pressure in the first wheel brake cylinder 10a is reduced during a pressure reduction interval $\Delta t_{decrease}$. This is done by draining brake fluid from the first wheel brake cylinder 10a via the first wheel outlet valve 32a. In addition, the first disconnecting valve 34a may be opened for a short period of time. The sealing of the valves 28a, 28b, 30a to 30d, 32a to 32d held closed during the pressure reduction interval $\Delta t_{decrease}$ is thus not affected by the pressure reduction in the first wheel brake cylinder 10a performed during the pressured reduction interval $\Delta t_{decrease}$. In addition, the pressure reduction in the first wheel brake cylinder 10a effected by draining brake fluid from the first wheel brake cylinder 10a via the first wheel outlet valve 32a does not require the motorized plunger device 12 to retract, so that it is ensured at this time that a breather hole of the motorized plunger device 12 is/remains closed.

After performing the processes described herein, optimal starting conditions for a determination of the p-V characteristic of the first wheel brake cylinder 10a performed during the measurement time interval $\Delta t_{measure}$ are achieved. The closing of the clearance of at least the first wheel brake cylinder 10a performed during the clearance closing interval $\Delta t_{clearance}$, and the sealing of at least the first wheel inlet valve 30a, the first check valve 46a, and the first isolating valve 28a effected during the at least one pressure increase interval $\Delta t_{increase1}$ and $\Delta t_{increase2}$, it is achieved that neither clearance effects nor leakage effects can affect the determination of the p-V characteristic of the first wheel brake cylinder 10a performed during the measurement time interval $\Delta t_{measure}$. In particular, at least the first wheel inlet valve 30a, the first check valve 46a, and the first isolating valve 28a are sealed "firmly" in such a way that leakage is not to be expected even when low pressures are present.

In order to determine the p-V characteristic of the first wheel brake cylinder 10a, the pressure prevailing in the first wheel brake cylinder 10a is increased during the measurement time interval $\Delta t_{measure}$ by a displacement, effected by the motorized plunger device 12, of brake fluid via the first isolating valve 28a and the first wheel inlet valve 30a into the first wheel brake cylinder 10a. At least once during the measurement time interval $\Delta t_{measure}$, a volume variable x that reflects a present volume in the first wheel brake cylinder 10a, and at the same time a pressure variable p that reflects a present pressure in the first wheel brake cylinder 10a are determined. Preferably, the pressure prevailing in the first wheel brake cylinder 10a is increased during the measurement time interval $\Delta t_{measure}$ with an average pressure build-up gradient of less than or equal to 35 bar/second. The p-V curve of the pressure prevailing in the first wheel brake cylinder 10a can thus be easily recorded by means of a plurality of measuring steps for simultaneously determining the pressure variable p and the volume variable x.

For example, the pressure in the first wheel brake cylinder 10a, as a pressure variable p, may be measured by means of a pressure sensor 50. As a volume variable x, the adjustment travel x of the piston of the motorized plunger device 12 can be determined from its initial position, e.g., by means of the rotor position sensor 22 of the motor 24. The present volume in the first wheel brake cylinder 10a may be calculated based on the adjustment travel x and a radius r of the piston of the motorized plunger device 12. A volumetric flow measurement is thus not necessary. In particular, the sealing of at least the first wheel inlet valve 30a, the first check valve 46a, and the first isolating valve 28a, effected during the at least one pressure increase interval $\Delta t_{increase1}$ and $\Delta t_{increase2}$ also ensures that the adjustment travel x (substantially) corresponds to the present volume in the first wheel brake cylinder 10a.

Subsequently, the p-V characteristic of the first wheel brake cylinder 10a is set, taking into consideration the at least one volume variable x and the at least one pressure variable p. As the p-V characteristic, a single value or a p-V characteristic curve may selectively be set. It is once again pointed out here that the determined p-V characteristic can be a wheel-specific/wheel-brake-cylinder-specific p-V characteristic. For example, as the p-V characteristic, a elasticity of the first wheel brake cylinder 10a according to equation (Eq. 1) or a stiffness Σ of the first wheel brake cylinder 10a according to equation (Eq. 2) may be set with:

$$E = \frac{\pi * x * r^2}{p} - K \qquad \text{(Eq. 3)}$$

$$\Sigma = \frac{p}{\pi * x * r^2 \Delta V} - K' \qquad \text{(Eq. 2)}$$

K and K' reflect a correction value defined by the internal elasticity of the brake system and the internal stiffness of the brake system, respectively.

FIG. 3 shows a schematic representation of an embodiment of the control device.

Usability of the control device 52 described in the following is limited to neither a s type of brake system or a particular vehicle/motor vehicle type of the vehicle/motor vehicle equipped with the respective brake system.

The control device 52 comprises an electronic device 54 whose first subunit 56 is designed and/or programmed to actuate at least one wheel inlet valve of the brake system upstream of at least one wheel brake cylinder of the brake system and/or at least one isolating valve of the respective brake system upstream of the at least one wheel brake cylinder. The first subunit 56 may be configured/programmed, in particular, as a pressure regulator and valve controller of the respective brake system. The first subunit 56 is primarily designed and/or programmed, before at least one measurement performed to determine a p-V characteristic of the at least one wheel brake cylinder, to first increase, during at least one pressure increase interval, a pressure exerted on the at least one closed wheel inlet valve and/or the at least one closed isolating valve, with an average pressure build-up gradient of greater than or equal to 50 bar/second up to a limit pressure of greater than or equal to 25 bar. Opportunities for effecting the advantageous displacement of brake fluid into the at least one wheel brake cylinder are already listed above. Only after this process does the first subunit 56 increase a pressure prevailing in the at least one wheel brake cylinder, during a measurement time interval by displacing brake fluid via the at least one wheel inlet valve and/or via the at least one isolating valve into the at least one wheel brake cylinder.

In addition, a second subunit 58 of the electronic device 54 is designed and/or programmed to set a p-V characteristic of the at least one wheel brake cylinder, taking into consideration at least one volume variable that was determined during the measurement time interval and reflects a present volume in the at least one wheel brake cylinder and at least one pressure variable that was determined at the same time and reflects a present pressure in the at least one wheel brake cylinder. Examples of the volume variable, the pressure variable and the p-V characteristic are already given above. The recorded pressure and volume signals are prepared by means of, for example, a suitable data analysis program, such as Matlab or Pyton. A third subunit 60 of the electronic device 54 may possibly be designed/programmed for plausibility checking and data preparation of the set p-V characteristic. For example, a curve of the p-V characteristic may be calculated by means of the third subunit 60 by using a fitting curve. The final p-V characteristic and/or intermediate values and parameters still needed may selectively be stored in a volatile memory 62 or in a non-volatile memory 64.

The determination of the p-V characteristic of the at least one wheel brake cylinder may be selectively started by a manual trigger 66 or a radio trigger 68. A corresponding start signal 70 is then output to all subunits 56, 58, and 60 of the control device 52.

In particular, when the vehicle is stationary, a determination of the p-V characteristic may take place without irritating the driver. The determined p-V characteristic of the at least one wheel brake cylinder can subsequently be output to at least one brake system controller 72. The determined p-V characteristic may possibly also be displayed in the vehicle or transmitted via radio to a garage.

The processes described above may still be performed years after an initial operation of the brake system to recalibrate the p-V characteristic. This has a positive effect on brake performance and on robustness thresholds of the brake system.

If desired, at the end of the processes described above, a common pressure build-up can still be effected in all four wheel brake cylinders 10a to 10d by transferring brake fluid via at least the open wheel inlet valves 30a to 30d into the four wheel brake cylinders 10a to 10d with the wheel outlet valves 32a to 32d closed. Subsequently, a sum of the p-V characteristics of the four wheel brake cylinders 10a to 10d is compared to a determined p-V characteristic of all four wheel brake cylinders 10a to 10d, whereby, if there is a deviation, leakage can be detected in one of the single wheel measurements.

The invention claimed is:

1. A method of determining a p-V characteristic of at least one wheel brake cylinder of a brake system of a vehicle, comprising the following steps:
   increasing a pressure present in the at least one wheel brake cylinder of the brake system, during a measurement time interval by displacing brake fluid via at least one wheel inlet valve of the brake system upstream of the at least one wheel brake cylinder and/or via at least one isolating valve of the brake system upstream of the at least one wheel brake cylinder into the at least one wheel brake cylinder, wherein at least once during the measurement time interval, determining, at the same time, a volume variable that reflects a present volume in the at least one wheel brake cylinder and a pressure variable that reflects the present pressure in the at least one wheel brake cylinder; and
   setting the p-V characteristic of the first wheel brake cylinder, taking into consideration the at least one volume variable and the at least one pressure variable;
   before the measurement time interval, increasing a pressure exerted on at least the at least one wheel inlet valve closed and/or the at least one isolating valve closed, with an average pressure build-up gradient of greater than or equal to 50 bar/second up to a limit pressure of greater than or equal to 25 bar during at least one pressure increase interval.

2. The method according to claim 1, wherein, during a first pressure increase interval of the at least one pressure increase interval, a partial volume pressure prevailing in a partial volume of the brake system limited by the at least one closed isolating valve is increased using a driver braking force exerted on a brake pedal of the brake system and/or using an operation of a motorized brake pressure build-up device up to at least the limit pressure of greater than or equal to 25 bar, and wherein at a beginning of a second pressure increase interval of the at least one pressure increase interval, the at least one isolating valve is opened, whereby brake fluid is displaced with the averaged pressure build-up gradient of greater than or equal to 50 bar/second from the partial volume via the at least one isolating valve to the at least one wheel inlet valve.

3. The method according to claim 1, wherein, after the at least one pressure increase interval and before the measurement time interval, the pressure prevailing in the at least one wheel brake cylinder is reduced during a pressure reduction interval by draining brake fluid from the at least one wheel brake cylinder via at least one wheel outlet valve of the brake system downstream of the at least one wheel brake cylinder.

4. The method according to claim 1, wherein, the pressure prevailing in the at least one wheel brake cylinder is increased during the measurement time interval with an average pressure build-up gradient of less than or equal to 35 bar/second.

5. The method according to claim 1, wherein the pressure exerted on at least the at least one closed wheel inlet valve and/or the at least one closed isolating valve is increased during the at least one pressure increase interval with the average pressure build-up gradient of greater than or equal to 50 bar/second up to the limit pressure of greater than or equal to 25 bar, wherein the limit pressure is sufficient to seal at least one check valve arranged in parallel to the at least one wheel inlet valve and/or sufficient to seal the at least one isolating valve.

6. The method according to claim 1, wherein, before the at least one pressure increase interval, the pressure prevailing in the at least one wheel brake cylinder is increased during a clearance closing interval up to a clearance closing pressure of greater than or equal to 40 bar, and then, and before the at least one pressure increase interval, the pressure prevailing in the at least one wheel brake cylinder is reduced to an output pressure of less than or equal to 5 bar.

7. A control device for a brake system of a vehicle, comprising:
an electronic device configured to:
actuate a wheel inlet valve of the brake system upstream of at least one wheel brake cylinder of the brake system and/or at least one isolating valve of the brake system upstream of the at least one wheel brake cylinder,
increase a pressure prevailing in the at least one wheel brake cylinder, during a measurement time interval by displacing brake fluid via the at least one wheel inlet valve and/or via the at least one isolating valve into the at least one wheel brake cylinder, and
setting a p-V characteristic of the at least one wheel brake cylinder, taking into consideration at least one volume variable determined during the measurement time interval and reflecting a present volume in the at least one wheel brake cylinder and at least one pressure variable that was determined at the same time and reflects a present pressure in the at least one wheel brake cylinder,
wherein the electronic device is additionally configured to increase, before the measurement time interval, a pressure exerted on at least the at least one wheel inlet valve closed and/or the at least one isolating valve closed, with an average pressure build-up gradient of greater than or equal to 50 bar/second up to a limit pressure of greater than or equal to 25 bar during at least one pressure increase interval.

8. The control device according to claim 7, wherein the electronic device is configured to effect or detect, using at least one provided sensor signal, during a first pressure increase interval of the at least one pressure increase interval, that a partial volume pressure prevailing in a partial volume of the brake system limited by the at least one closed isolating valve is increased at least at an end of the first pressure increase interval using a driver braking force exerted on a brake pedal of the brake system and/or using an operation of a motorized brake pressure build-up device up to at least the limit pressure of greater than or equal to 25 bar, and at a beginning of a second pressure increase interval of the at least one pressure increase interval, to open the at least one isolating valve such that a brake fluid displacement with the average pressure build-up gradient of greater than or equal to 50 bar/second from the partial volume via the at least one isolating valve to the at least one closed wheel inlet valve is triggered.

9. The control device according to claim 8, wherein the electronic device is configured to control during the first pressure increase interval as the motorized brake pressure build-up device, a motorized plunger device integrated into the brake system or an electromechanical brake booster or a pump motor of at least one pump of the brake system upstream of a master brake cylinder of the brake system such that the partial volume pressure is increased using the controlled motorized brake pressure build-up device at least at the end of the first pressure increase interval up to at least the limit pressure of greater than or equal to 25 bar.

10. A brake system for a vehicle, comprising:
a control device, including:
an electronic device configured to:
actuate a wheel inlet valve of the brake system upstream of at least one wheel brake cylinder of the brake system and/or at least one isolating valve of the brake system upstream of the at least one wheel brake cylinder,
increase a pressure prevailing in the at least one wheel brake cylinder, during a measurement time interval by displacing brake fluid via the at least one wheel inlet valve and/or via the at least one isolating valve into the at least one wheel brake cylinder, and
setting a p-V characteristic of the at least one wheel brake cylinder, taking into consideration at least one volume variable determined during the measurement time interval and reflecting a present volume in the at least one wheel brake cylinder and at least one pressure variable that was determined at the same time and reflects a present pressure in the at least one wheel brake cylinder,
wherein the electronic device is additionally configured to increase, before the measurement time interval, a pressure exerted on at least the at least one wheel inlet valve closed and/or the at least one isolating valve closed, with an average pressure build-up gradient of greater than or equal to 50 bar/second up to a limit pressure of greater than or equal to 25 bar during at least one pressure increase interval;
the at least one wheel brake cylinder; and
the at least one wheel inlet valve upstream of the at least one wheel brake cylinder and/or the at least one isolating valve upstream of the at least one wheel brake cylinder.

* * * * *